(12) United States Patent
Wu

(10) Patent No.: US 10,129,532 B2
(45) Date of Patent: Nov. 13, 2018

(54) 3D DISPLAY DEVICE AND DRIVING METHOD THEREOF

(71) Applicant: BOE TECHNOLOGY GROUP CO., LTD., Beijing (CN)

(72) Inventor: Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 613 days.

(21) Appl. No.: 14/090,525

(22) Filed: Nov. 26, 2013

(65) Prior Publication Data

US 2014/0146149 A1   May 29, 2014

(30) Foreign Application Priority Data

Nov. 27, 2012 (CN) .......................... 2012 1 0493192

(51) Int. Cl.
  *H04N 13/305* (2018.01)
  *G02B 27/22* (2018.01)
  *H04N 13/398* (2018.01)

(52) U.S. Cl.
  CPC ....... *H04N 13/305* (2018.05); *G02B 27/2214* (2013.01); *H04N 13/398* (2018.05)

(58) Field of Classification Search
  CPC .................................................. H04N 13/0404
  (Continued)

(56) References Cited

U.S. PATENT DOCUMENTS

2011/0248911 A1* 10/2011 Si ...................... H04N 13/0418
                                                           345/156
2011/0273463 A1* 11/2011 Lee .................... G02B 27/2264
                                                           345/545

(Continued)

FOREIGN PATENT DOCUMENTS

CN    101131810 A    2/2008
CN    102238400 A    11/2011
(Continued)

OTHER PUBLICATIONS

First Office Action issued by the Chinese Patent Office for Chinese Patent Application No. 2012104931925 dated Aug. 28, 2014, 7pgs.

(Continued)

*Primary Examiner* — Yulin Sun
(74) *Attorney, Agent, or Firm* — Ladas & Parry LLP

(57) ABSTRACT

Embodiments of the present invention disclose a 3D display device and a driving method thereof, and the 3D display device comprises: a display panel, comprising sub-pixel units arranged in a matrix and defined by data lines and gate signal lines, and each gate signal line being located between two adjacent columns of sub-pixel units; a lenticular lens grating, provided at a light exiting side of the display panel, splitting light emitted from the display panel, and comprising lens units, wherein each lens unit corresponds to at least two adjacent columns of sub-pixel units; in a 3D display mode, columns of sub-pixel units alternatively display a left/right eye image and a right/left eye image, and each lens unit comprises, in a region corresponding to each column of the sub-pixel units, a lens structure matching the left or right eye image currently displayed by the column of the sub-pixel units.

19 Claims, 9 Drawing Sheets

(58) Field of Classification Search
USPC .......................................................... 348/59
See application file for complete search history.

(56) References Cited

U.S. PATENT DOCUMENTS

| | | | |
|---|---|---|---|
| 2013/0093657 A1* | 4/2013 | Song | G09G 3/3648 |
| | | | 345/92 |
| 2013/0241922 A1* | 9/2013 | Kim | H04N 13/0409 |
| | | | 345/419 |
| 2014/0063382 A1 | 3/2014 | Wu | |

FOREIGN PATENT DOCUMENTS

| | | |
|---|---|---|
| CN | 102591090 A | 7/2012 |
| CN | 102629041 A | 8/2012 |
| EP | 2509065 A1 | 10/2012 |
| GB | 2480119 A | 11/2011 |
| WO | 2011/055276 A1 | 5/2011 |

OTHER PUBLICATIONS

English translation of First Office Action issued by the Chinese Patent Office for Chinese Patent Application No. 2012104931925 dated Aug. 28, 2014, 7pgs. 4pgs.
Extended European Search Report dated Mar. 15, 2017; Appln. No. 13194449.8-1903/2736260.

* cited by examiner

3D DISPLAY DEVICE AND DRIVING METHOD THEREOF

CROSS REFERENCE TO RELATED APPLICATIONS

This application claims priority from Chinese National Application No. 201210493192.5 filed on Nov. 27, 2012, the contents of which are incorporated herein by reference.

TECHNICAL FIELD

Embodiments of the present invention relate to a 3D display device and a driving method thereof.

BACKGROUND

Currently, a three-dimensional (3D) stereoscopic display technology, especially a naked-eye 3D stereoscopic display technology, has become one of main trends in the display field. The current mainstream naked-eye 3D display technologies are mainly divided into a parallax barrier type and a lenticular lens grating type, which have much similar principles. Taking the lenticular lens grating type as an example, the schematic view of its principle is shown in FIG. 1, the lenticular lens grating is used to spit light emitted from a left eye pixel and a right eye pixel of a display panel, so that a viewer's left eye only see a left eye image and a viewer's right eye only see a right eye image, and thus the stereoscopy can be achieved.

In a 3D display device having the above structure, the left or right eye of the viewer can only see images displayed by half of a plurality of sub-pixel units in the display panel at the same time, thus a resolution of the 3D display mode is only half of the 2D display mode.

In order to ensure the resolution of the 3D display mode, the following manner can be used: in a first frame of image, as shown in FIG. 2a, odd number columns of the sub-pixel units of the display panel are made to display the left eye image and even number columns of the sub-pixel units are made to display the right eye image, and the viewer can only see the left eye image in the left eye and can only see the right eye image in the right eye via light shielding strips and light transmitting strips of a parallax barrier, or lens units of a lenticular lens grating, i.e., the left eye can see the odd number columns of sub-pixel units and the right eye can see the even number columns of sub-pixel units. In a second frame of image, as shown in FIG. 2b, the odd number columns of sub-pixel units in the display panel are made to display the right eye image and the even number columns of sub-pixel units in the display panel are made to display the left eye image, and then, positions of the light shielding strips and the light transmitting strips on the parallax barrier or lens structures of the lens units of the lenticular lens grating are changed so that the viewer can only see the left eye image in the left eye and can only see the right eye image in the right eye, i.e., light emitted from the even number columns of sub-pixel units is projected into the left eye of the viewer and light emitted from the odd number columns of sub-pixel units is projected into the right eye of the viewer. Thus, as long as a time interval between two frames is short enough, a single eye of the viewer can substantially obtain a stimulations from both the odd number columns of sub-pixel units and the even number columns of sub-pixel units at the same time due to the visual persistence effect of the human eye, thus the 3D display resolution will not be decreased.

However, for a current structure of the display panel, as shown in FIG. 3, each of gate signal lines is provided between two adjacent rows of sub-pixel units, and the display panel is driven by using a driving manner of scanning row by row, i.e., at a certain moment, one row of sub-pixel units can be selected only through one gate signal line. Taking a liquid crystal panel as an example, at a first moment of one frame of image, a gate signal line G1 is inputted a high voltage, thin film transistors connected with the gate signal line are turned on, and each data signal line respectively inputs a signal voltage to a pixel electrode of each of the first row of sub-pixel units via a source electrode or a drain electrode of the thin film transistor. The signal voltage applied to the pixel electrode in each of the sub-pixel units and a common voltage applied to a common electrode form a pixel electric field, which controls a deflection of liquid crystal molecules in each of the sub-pixel units to realize the display. At a second moment of the one frame of image, a gate signal line G2 is inputted a high voltage and selects a second row of the sub-pixel units connected with it, while the gate signal line G1 is inputted a low voltage, so that the TFTs of the first row of sub-pixel units are turned off, and this is repeated to refresh each row of the sub-pixel units in the liquid crystal panel row by row.

Thus, when a state of the lenticular lens grating corresponding to the first frame of image of the display panel is changed into a state corresponding to the second frame of image of the display panel, an image refreshing also is performed on the display panel from top to bottom, and thus, a phenomenon that the first frame of image and the second frame of image are simultaneously displayed on the display panel occurs, and an image crosstalk is generated. As shown in FIG. 4, when the second frame of image is just refreshed to a fourth row, an upper portion of the 3D display device displays the second frame of image and matches a state of the lenticular lens grating that corresponds to the second frame of image, while a lower portion of the 3D display device displays the first frame of image and does not matches the state of the lenticular lens grating corresponding to the second frame of image, and thus, the image crosstalk is generated and the effect of the 3D display is adversely affected.

SUMMARY

Embodiments of the present invention provide a 3D display device and a driving method thereof capable of eliminating or reducing an image crosstalk of a lenticular lens grating type 3D display.

An embodiment of the present invention provides a 3D display device, comprising: a display panel, comprising a plurality of sub-pixel units arranged in a matrix and defined by a plurality of data lines and a plurality of gate signal lines crossing one another, and each of the plurality of gate signal lines being located between two adjacent columns of sub-pixel units; a lenticular lens grating, provided at a light exiting side of the display panel, splitting light emitted from the display panel, and comprising a plurality of lens units, wherein each of the plurality of lens units corresponds to at least two adjacent columns of sub-pixel units in the display panel; in a 3D display mode, a plurality of columns of sub-pixel units in the display panel alternatively display a left eye image/a right eye image and a right eye image/a left eye image, and each of the lens units comprises, in a region corresponding to each column of the sub-pixel units, a lens structure matching the left eye image or the right eye image currently displayed by the column of the sub-pixel units.

An embodiment of the present invention further provides a driving method of the above 3D display device, comprising: displaying each frame of image in the display panel by using a driving manner of scanning the gate signal lines column by column; in a 3D display mode, when an image displayed by one column of the sub-pixel units in the display panel changes, in the lenticular lens grating, a lens structure in a region of the lens units corresponding to the one column of the sub-pixel units is changed into a lens structure matching a left eye image or a right eye image to be displayed by the one column of sub-pixel units

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Hereafter, a 3D display device and a driving method thereof according to embodiments of the present invention are detailed in combination with the drawings.

A thickness of each layer, and a size and a shape of each region in the figures are not to scale, and are only intended to exemplarily describe the embodiments of the present invention.

The 3D display device according to an embodiment of the present invention comprises: a display panel, and a lenticular grating, disposed at a light exiting side of the display panel for splitting light emitted from the display panel.

Figure 1:
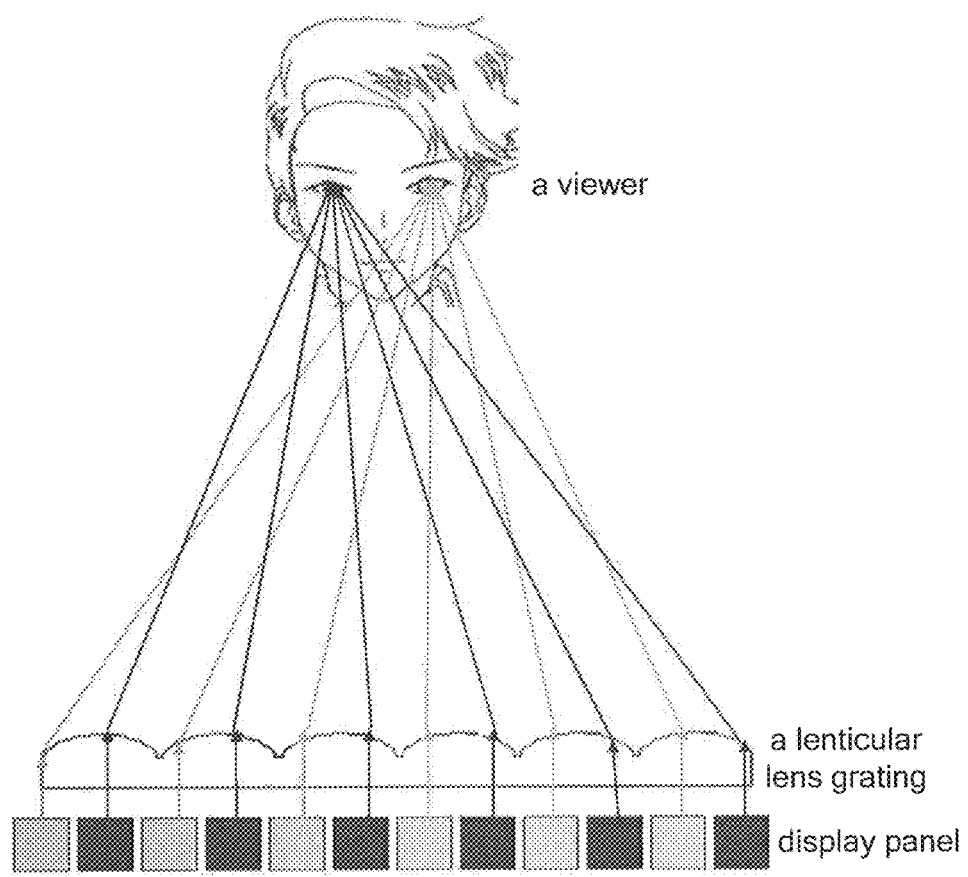
FIG. 1 is a schematic view of a basic principle of a lenticular lens grating type 3D display device.
Figure 2A:
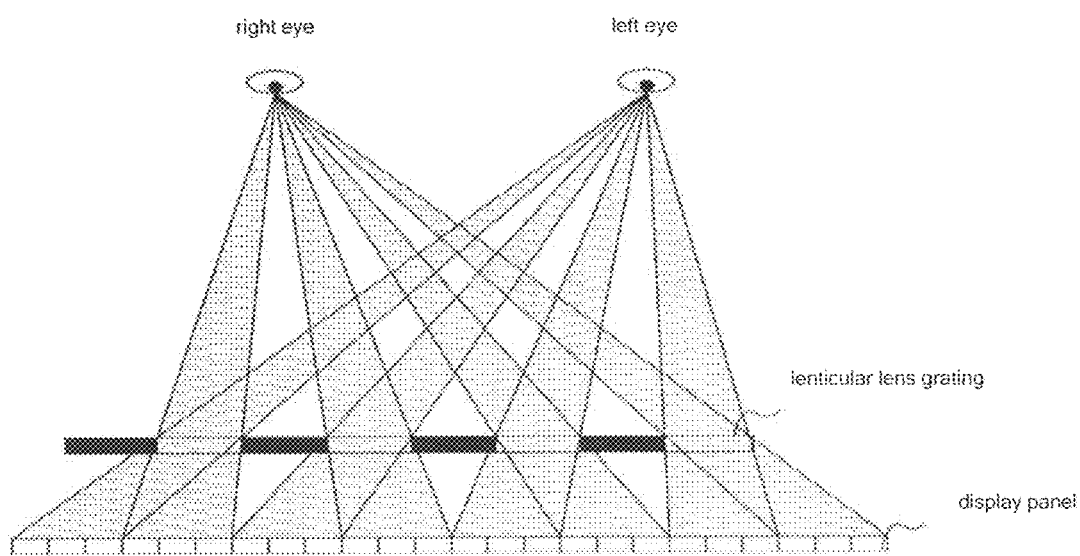
FIGS. 2a and 2b are respectively schematic views of the lenticular lens grating type 3D display device during displaying a first frame of image and a second frame of image.
Figure 2B:
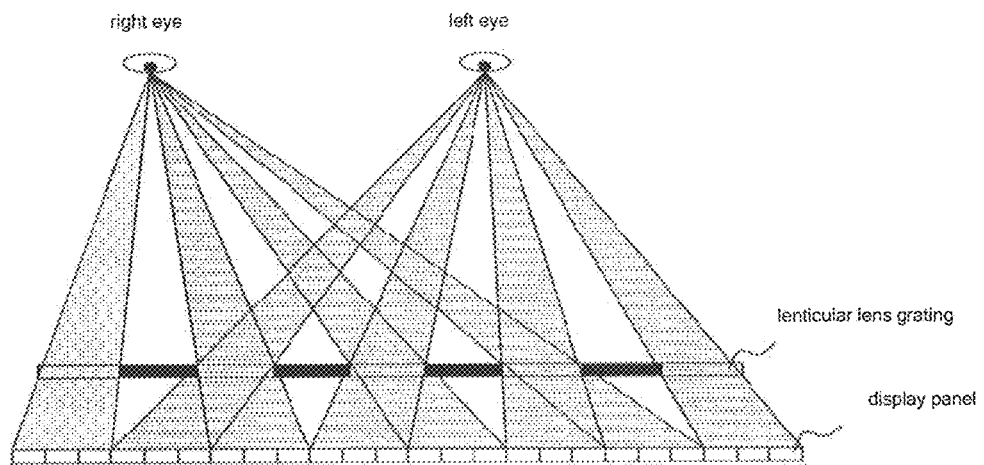
Figure 3:
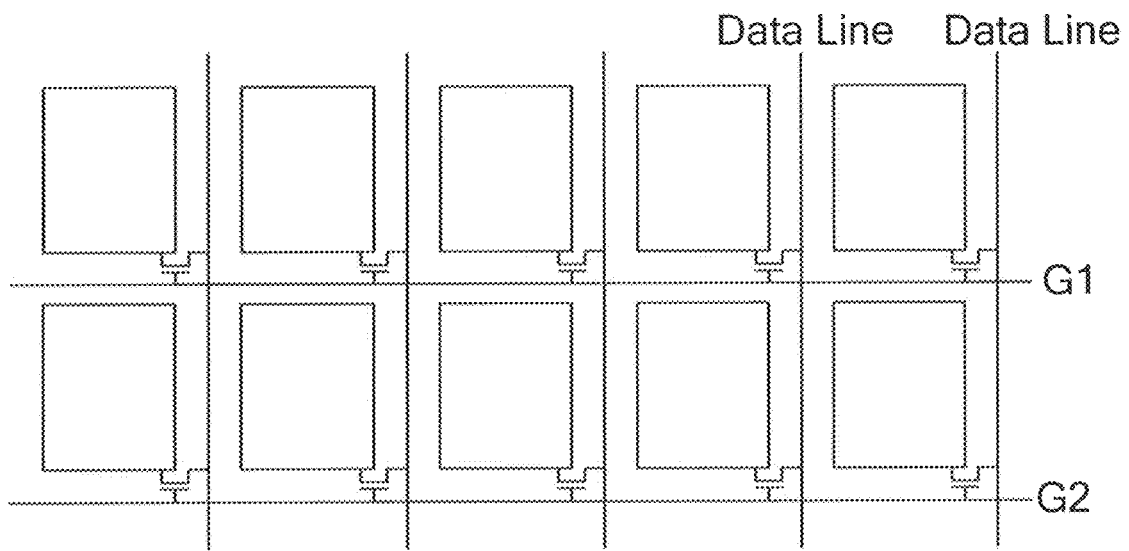
FIG. 3 is a schematic structural view of a display panel of a current 3D display device.
Figure 4:
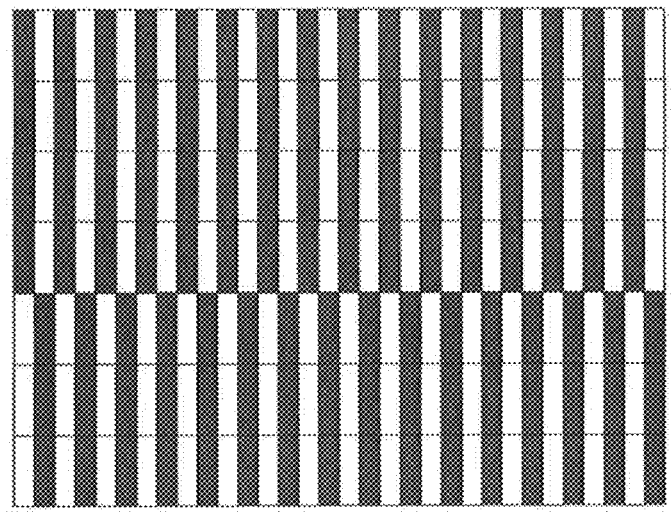
FIG. 4 is a schematic view of an image crosstalk generated in the current 3D display device.
Figure 5:
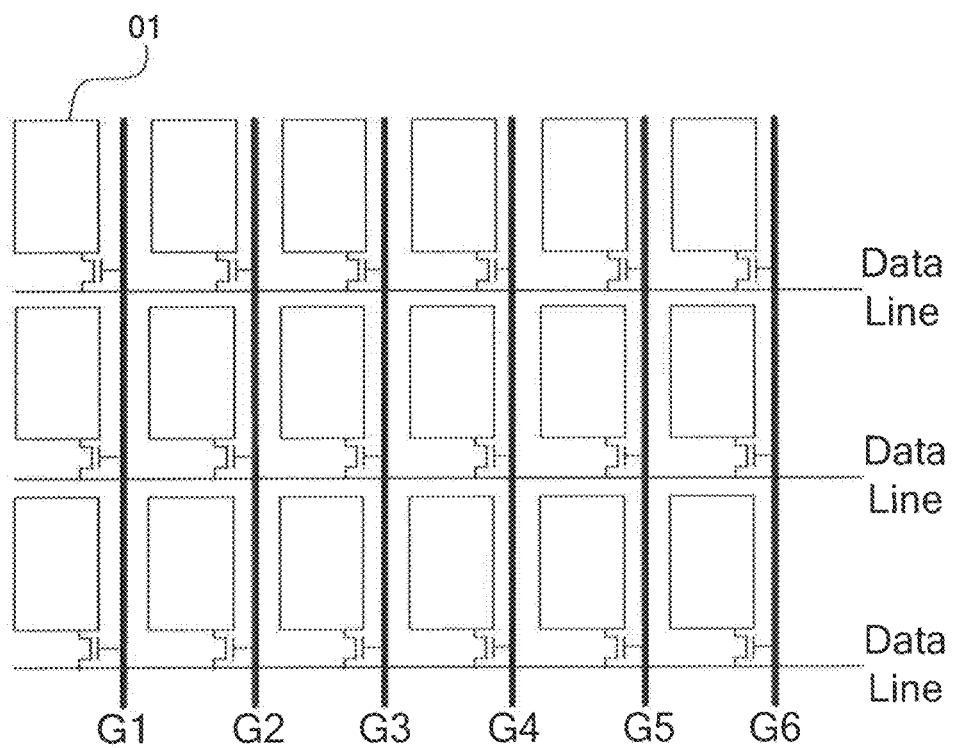
FIG. 5 is a schematic structural view of a display panel in a 3D display device according to an embodiment of the present invention.

As shown in FIG. 5, the display panel comprises a plurality of sub-pixel units 01 arranged in a matrix and defined by a plurality of data lines and a plurality of gate signal lines crossing one another, and each of the gate signal lines G1, G2, G3, G4, G5, G6, . . . in the display panel is located between two adjacent columns of sub-pixel units; in a 3D display mode, a plurality of columns of sub-pixel units in the display panel alternatively display a left eye image/a right eye image and a right eye image/a left eye image. Exemplarily, in a current frame of image, one of the plurality of columns of the sub-pixel units 01 display the left eye image/the right eye image, while an adjacent column of the sub-pixel units 01 display the right eye image/the left eye image; and in a next frame of image, the one column of sub-pixel units display the right eye image/the left eye image, while the adjacent column of the sub-pixel units display the left eye image/the right eye image.

Figure 6:
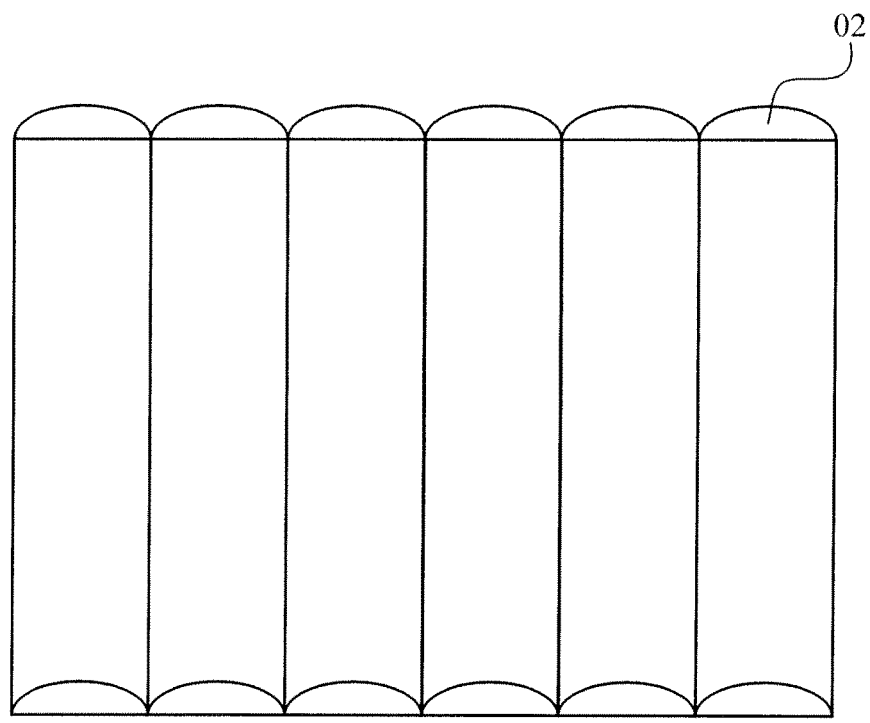
FIG. 6 is a schematic structural view of a lenticular lens grating in the 3D display device according to an embodiment of the present invention.

As shown in FIG. 6, the lenticular lens grating comprises a plurality of lens units 02, and one lens unit 02 corresponds to at least two adjacent columns of sub-pixel units 01 in the display panel; in the 3D display mode, the lens units 02 comprises, in a region corresponding to each column of sub-pixel units 01, a lens structure matching the left eye image or the right eye image currently displayed by the column of sub-pixel units 01.

Exemplarily, the lens structure of each of the lens units in a region corresponding to each column of the sub-pixel units may be separately controlled.

In the above 3D display device according to the embodiment of the present invention, each pixel unit of a current display panel is rotated by 90 degrees, so that the gate signal lines are arranged vertically and the data signal lines are arranged horizontally, thus the driving manner of the display panel is changed from scanning row by row to scanning column by column. The lenticular lens grating above the display panel has a plurality of lens units each corresponding to at least two adjacent columns of sub-pixel units, and in the 3D display mode, when each column of sub-pixel units in the display panel is performed an image refreshing, the lens structure in a region corresponding to the column of sub-pixel units is synchronously changed, so that the lens structure matches the image to be displayed in the column of sub-pixel units , which is a left eye image or right eye image in a double viewpoint system, and thus, it is ensured that an image displayed after the image refreshing in the column of sub-pixel units can enter into an appropriate viewing region under an effect of the refreshed lenticular lens grating, the image crosstalk the 3D display device is improved and the 3D display effect is enhanced.

Exemplarily, for the 3D display device according to the embodiment of the present invention, a black frame can be inserted between the current frame of image and the next frame of image, so that the display panel displays the black frame prior to displaying the next frame of image, when each column of sub-pixel units of the display panel is refreshed to display the black frame, the lens structure in a region corresponding to the column of sub-pixel units is changed, so that the changed lens structure matched the next frame of image.

Exemplarily, in the embodiment of the present invention, the type of the display panel are not defined, and the display panel can be a liquid crystal display (LCD) panel, an organic electroluminescent display (OLED) panel, a plasma display (PDP) panel or a field emission display (FED) panel, and is not defined herein.

Figure 7A:
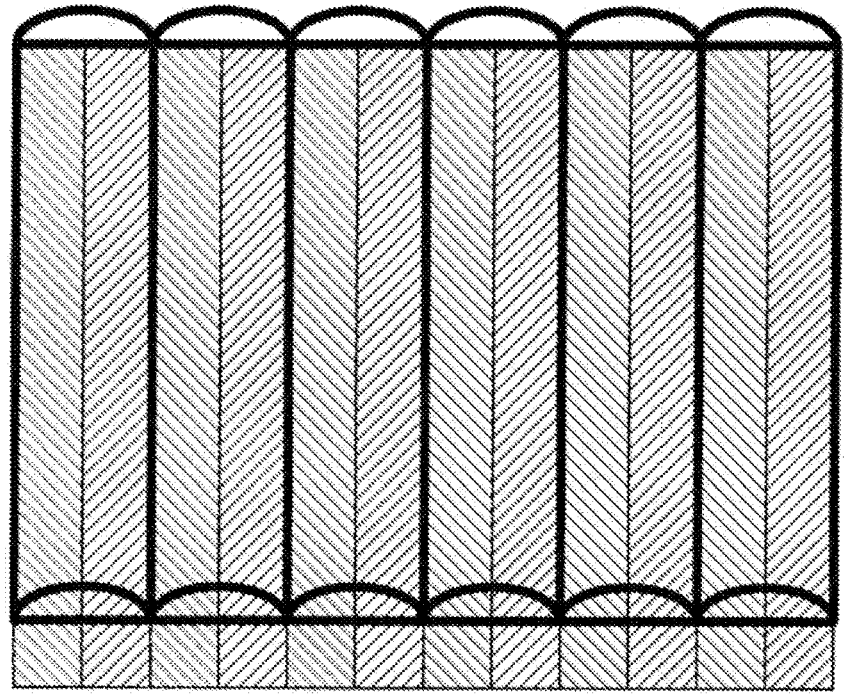
FIGS. 7a and 7b are respectively schematic views of the lenticular lens grating when the 3D display device according to an embodiment of the present invention displays a current frame of image and a next frame of image.
Figure 7B:
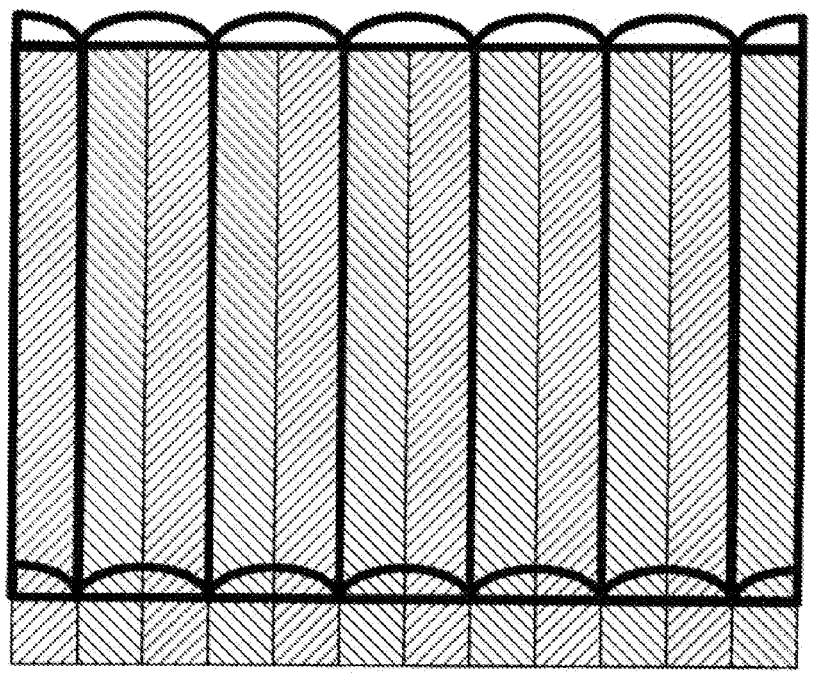

Exemplarily, in the 3D display mode, when the display panel displays the current frame of image, a plurality of columns of sub-pixel units alternatively display the left eye image and the right eye image, and in the next frame of image, the plurality of columns of sub-pixel units respectively display the right eye image and the left eye image. For example, as shown in FIG. 7a, in the current frame of image, odd number columns of sub-pixel units of the display panel display the left eye image (in FIG. 7a, the left eye image is denoted with right-inclined lines), and even number columns of sub-pixel units display the right eye image (in FIG. 7a, the right eye image is denoted with left-inclined lines); in the next frame of image, as shown in FIG. 7b, the odd number columns of sub-pixel units of the display panel display the right eye image (in FIG. 7b, the right eye image is denoted with left-inclined lines), while the even number columns of sub-pixel units display the left eye image (in FIG. 7b, the left eye image is denoted with right-inclined lines). Thus, as long as a time interval between two frames is short enough, a single eye of the viewer can substantially obtain a stimulations from both the odd number columns of sub-pixel units and the even number columns of sub-pixel units at the same time due to the visual persistence effect of the human eye, thus a resolution of the 3D display will not be decreased.

Exemplarily, the time interval between the current frame of image and the next frame of image is shorter than or equal to a visual persistence time of the human eye; and a refreshing frequency of the display panel is larger than or equal to 120 Hz.

Exemplarily, in the lenticular lens grating, usually each lens unit corresponds to the same number of columns of sub-pixel units. For example, each lens unit generally corresponds to two adjacent columns of sub-pixel units to form two viewpoints, of course, each lens unit may also correspond to four adjacent or eight adjacent columns of sub-pixel units, to form four viewpoints or eight viewpoints, and this is not defined herein.

Description is made hereinafter taking it as an example that each lens unit corresponds to two adjacent columns of sub-pixel units.

In the 3D display mode, as the lens structure of each of the lens units needs to match the left eye mage or the right eye image currently displayed by each corresponding column of sub-pixel units, comparing FIGS. 7a and 7b showing the lens structure of each lens unit when the display panel displays the two adjacent frames of images (the lens units are indicated with thick lines in the figures), it can be seen that, in the two frames, the lens structures of the lens units shift one column of sub-pixel units along a column scanning direction of the display panel.

Based on the same inventive concept, an embodiment of the present invention further provides a driving method of the above display device, comprising:

S101, displaying each frame of image in the display panel by using a driving manner of scanning the gate signal lines column by column;

Exemplarily, the driving manner of scanning the gate signal lines column by column comprises: sequentially applying a gate scanning signal to each of the gate signal lines in an order from left to right, from right to left, from middle to two sides, or from two sides to middle.

S102, in the 3D display mode, when an image displayed by one column of the sub-pixel units in the display panel changes, in the lenticular lens grating, a lens structure in a region of the lens units corresponding to the one column of the sub-pixel units is changed into a lens structure matching a left eye image or a right eye image to be displayed by the one column of sub-pixel units.

Exemplarily, changing the image displayed by the one column of the sub-pixel units comprises: changing the image displayed by the one column of sub-pixel units from the left eye image to the right eye image; and changing the image displayed by the one column of sub-pixel units from the right eye image to the left eye image.

In the above driving method according to the embodiment of the present invention, the display panel is driven by using a driving manner of scanning column by column, when the display panel is performed the scanning column by column, the corresponding lens unit in the lenticular lens grating synchronously changes its lens structure, and thus, it is ensured that an image displayed after the image refreshing in the column of sub-pixel units can enter into an appropriate viewing region under an effect of the refreshed lenticular lens grating, the image crosstalk the 3D display device is improved and the 3D display effect is enhanced.

The driving method of the 3D display device according to the embodiment of the present invention will be described exemplarily as follow in combination with FIGS. 7a, 7b, 8a, 8b and 8c, and a description is made taking changes of the lens structures of the lens units of the lenticular lens grating as an example when a current frame of image shown in FIG. 7a is changed into a next frame of image shown in FIG. 7b.

Figure 8A:
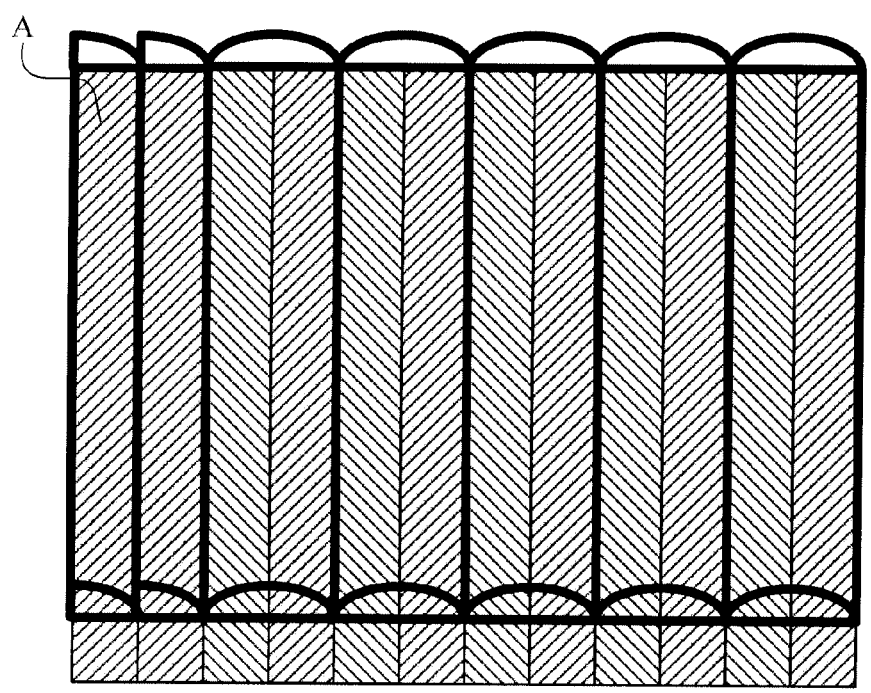
FIGS. 8a-8c are schematic views of a lenticular lens grating of a 3D display device in various states in a driving method according to an embodiment of the present invention.

At a first moment of the scanning of the next frame of image, as shown in FIG. 8a, when an image displayed in a first column of sub-pixel units of the display panel on the left is changed from a left eye image (the left eye image is denoted with right-inclined lines) to a right eye image in a next frame (the right eye image is denoted with left-inclined lines), the lens structure of the lens unit in a region A corresponding to the first column is restructured and is changed to a lens structure matching the right eye image, and the lens structure in other region of the lens unit is not changed, and the other lens units are not change, either.

Figure 8B:
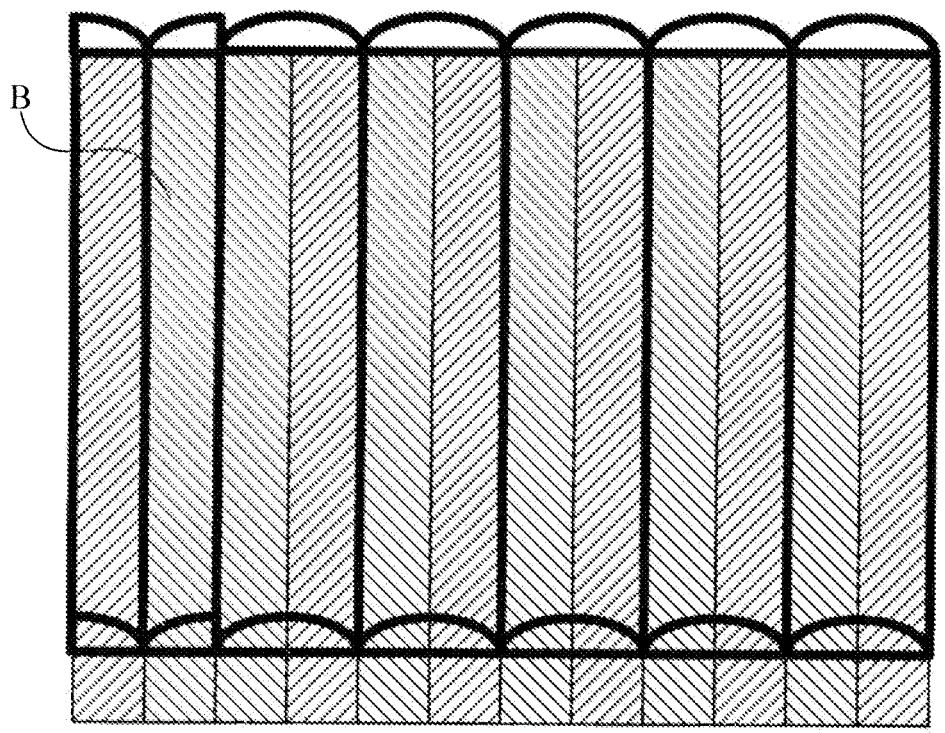

At a second moment of the scanning of the next frame of image, as shown in FIG. 8b, when an image displayed in a second column of sub-pixel units of the display panel on the left is changed from the right eye image (the right eye image is denoted with left-inclined lines) to the left eye image in the next frame (the left eye image is denoted with right-inclined lines), the lens structure of the lens unit in a region B corresponding to the second column is restructured and is changed to a lens structure matching left eye image, and the other lens units are not changed.

Figure 8C:
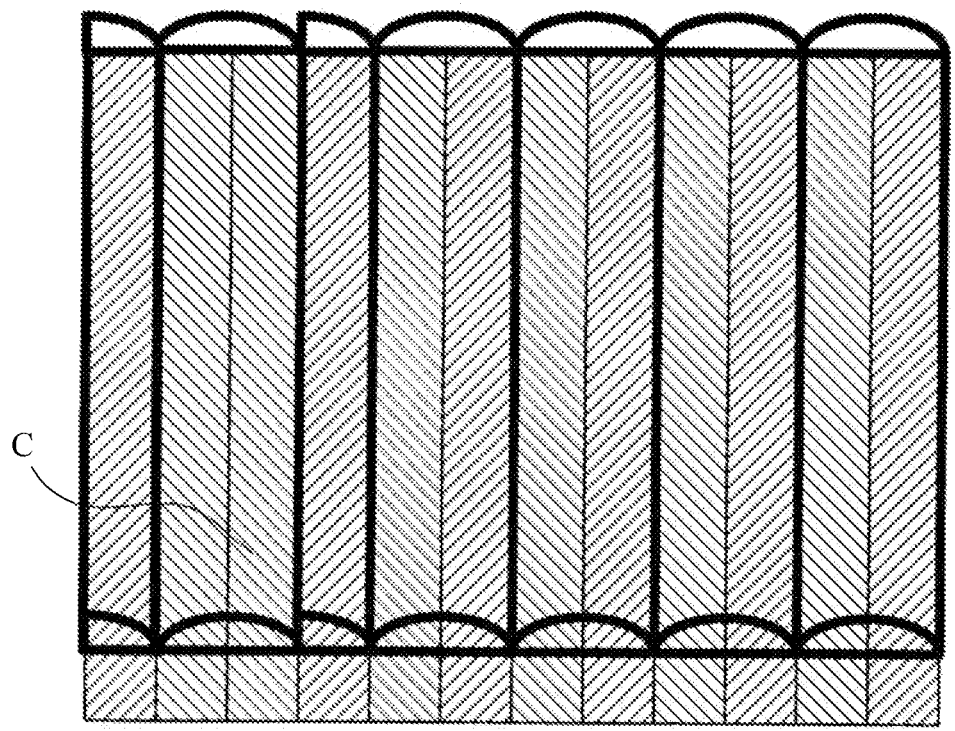

At a third moment of the scanning of the next frame of image, as shown in FIG. 8c, when an image displayed in a third column of sub-pixel units of the display panel on the left is changed from the left eye image (the left eye image is denoted with right-inclined lines) to the right eye image in the next frame (the right eye image is denoted with left-inclined lines), the lens structure of the lens unit in a region C corresponding to the third column is restructured and is changed to a lens structure matching the right eye image, and the lens structure in other region of the lens unit is not changed, and the other lens units are not change, either.

The image refreshing for the next frame is completed in the same way.

Figure 9:
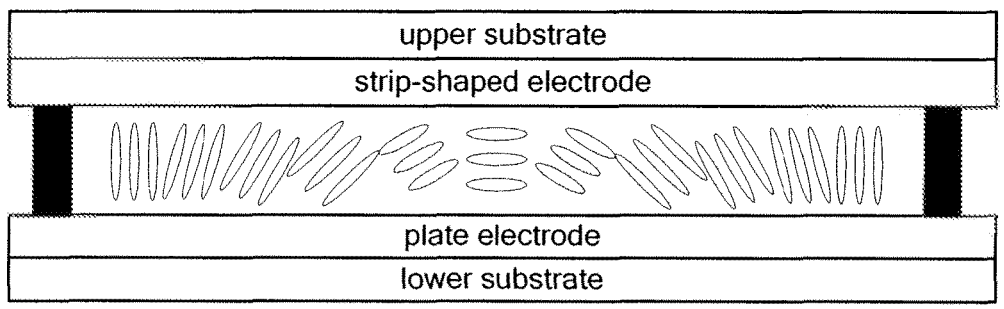
FIG. 9 is a schematic structural view of a liquid crystal lens grating.

Exemplarily, the lenticular lens grating according to the embodiment of the present invention can be a liquid crystal lens grating, and a schematic structure of the liquid crystal lens grating is shown in FIG. 9, comprising: an upper substrate, a lower substrate and a liquid crystal layer disposed between the two substrates, and the upper substrate and the lower substrate are respectively formed with a strip-shaped electrode and a plate electrode thereon; in the 3D display mode, different voltages are inputted to strip-shaped electrodes at different positions, and different electric field intensities are generated, so that corresponding liquid crystal molecules have different degrees of deflections and the liquid crystal layer has the function of a lens.

As the liquid crystal molecules in the liquid crystal lens grating usually have a relatively long response time, it is difficult to synchronize the restructuring of the lens structure of the lens units and the image refreshing of the display panel. Therefore, furthermore, in another driving method of the 3D display device according to an embodiment of the present invention, a black frame can be inserted by using the driving manner of scanning the gate signal lines column by column between two frames of images displayed by the display panel. Thus, before the display panel displays the next frame of image, the inserted black frame is displayed, that is, before displaying the next frame of image, the image displayed by the column of sub-pixel units is changed from the left eye image/the right eye image to the black frame. When the display panel displays the black frame through scanning column by column, each lens structure of each of the lens units is restructured, so that each lens structure matches the next frame of image, and thus, when the display panel displays the next frame of image, each lens unit of the lenticular lens grating has been restructured, which can more effectively avoid the image crosstalk of the 3D display due to a mismatching of an image displayed by the display panel and the lens structure of the lenticular lens grating.

Figure 10A:
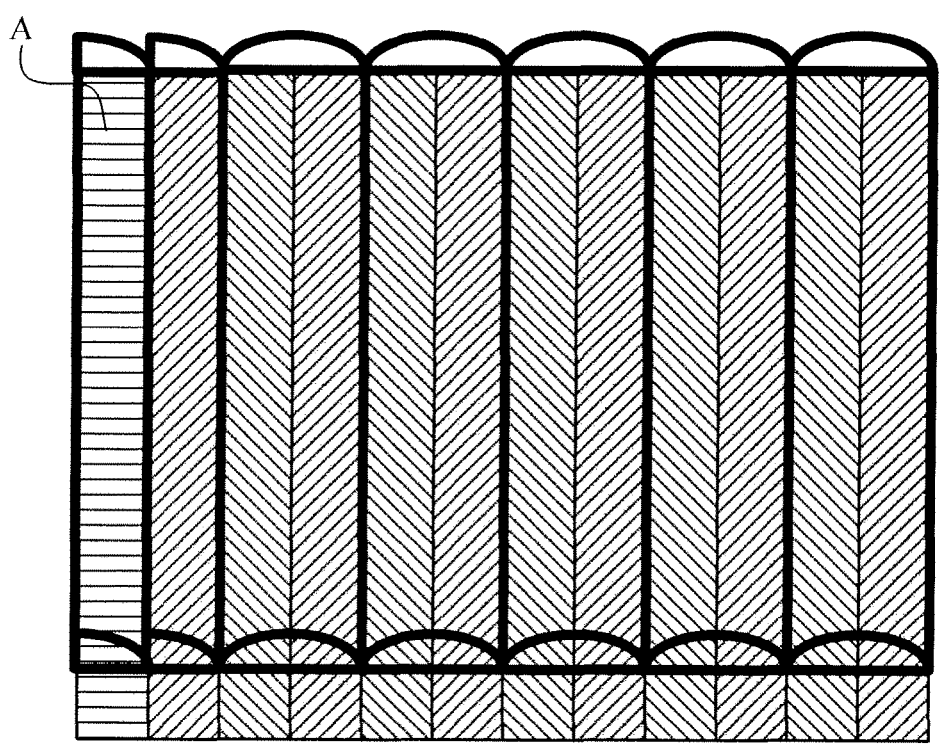
FIGS. 10a-10d are schematic views of a lenticular lens grating of a 3D display device in various states in another driving method according to an embodiment of the present invention.

Another driving method of the 3D display device according to the embodiment of the present invention will be described exemplarily as follow in combination with FIGS. 7a, 7b and 10a-10d, and the black frame is inserted between the current frame of image shown in FIG. 7a and the next frame of image shown in FIG. 7b, and changes of the lens units in the lenticular lens grating are as follow:

At a first moment of the scanning of the black frame, as shown in FIG. 10a, when an image displayed in a first column of sub-pixel units of the display panel on the left is changed from the left eye image (the left eye image is denoted with right-inclined lines) to the black frame (the black frame is denoted with horizontal lines), the lens structure of the lens unit in a region A corresponding to the first column is restructured and is changed to a lens structure matching the right eye image, and the lens structure in other region of the lens unit is not changed, and the other lens units are not change, either.

Figure 10B:
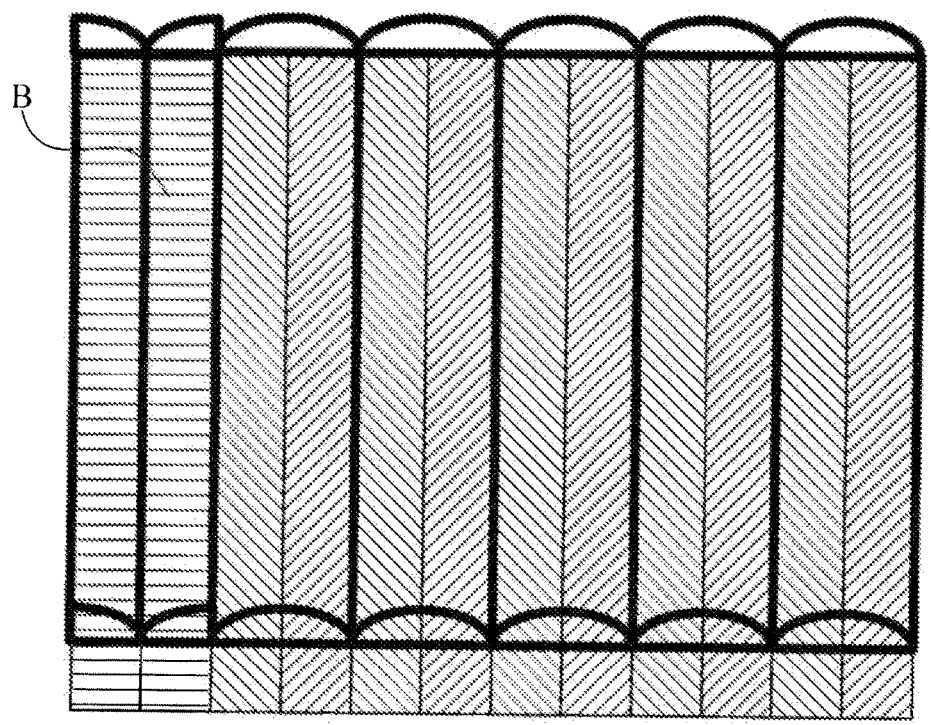

At a second moment of the scanning of the black frame, as shown in FIG. 10b, when an image displayed in a second column of sub-pixel units of the display panel on the left is changed from the right eye image (the right eye image is denoted with left-inclined lines) to the black frame (the black frame is denoted with horizontal lines), the lens structure of the lens unit in a region B corresponding to the second column is restructured and is changed to a lens structure matching left eye image, and the other lens units are not changed.

Figure 10C:
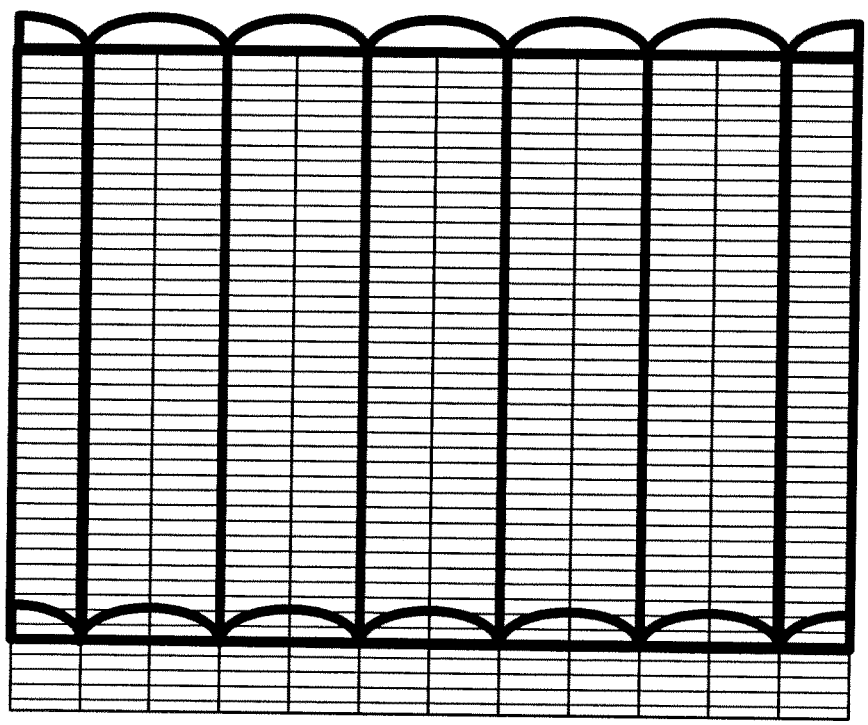

After the image refreshing of the display panel for the black frame is completed in the same way, as shown in FIG. 10c, all columns of the sub-pixel units of the display panel display the black frame, the lens structures of the lens units have been restructured and is changed to the lens structures matching the next frame of image to be displayed.

Figure 10D:
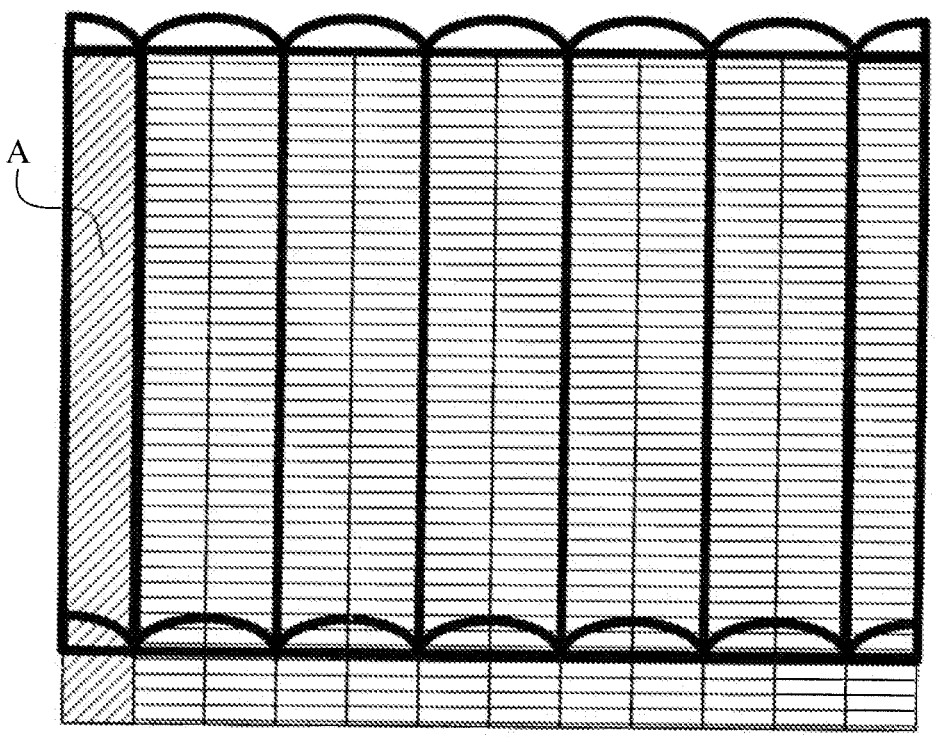

At a first moment of the scanning of the next frame of image, as shown in FIG. 10d, when an image displayed in a first column of sub-pixel units of the display panel on the left is changed from the black frame to a right eye image in the next frame (the right eye image is denoted with left-inclined lines), the lens structure of the lens unit in the region A corresponding to the first column has been restructured, and the right eye image is projected to the viewer's right eye. The scanning of the next frame is completed subsequently in the same way.

In the 3D display device and the driving method thereof according to embodiments of the present invention, each pixel unit of a current display panel is rotated by 90 degrees, so that the gate signal lines are arranged vertically and the data signal lines are arranged horizontally, thus the driving manner of the display panel is changed from scanning row by row to scanning column by column. The lenticular lens grating above the display panel has a plurality of lens units each corresponding to at least two adjacent columns of sub-pixel units, and in the 3D display mode, when each column of sub-pixel units in the display panel is performed an image refreshing, the lens structure in a region corresponding to the column of sub-pixel units is synchronously changed, so that the lens structure matches the image to be displayed in the column of sub-pixel units , which is a left eye image or a right eye image in a double viewpoint system, and thus, it is ensured that an image displayed after the image refreshing in the column of sub-pixel units can enter into an appropriate viewing region under an effect of the refreshed lenticular lens grating, the image crosstalk the 3D display device is improved and the 3D display effect is enhanced.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The invention claimed is:

1. A 3D display device, comprising:
   a display panel, comprising a plurality of sub-pixel units arranged in a matrix and defined by a plurality of data lines and a plurality of gate signal lines crossing one another, and each of the plurality of gate signal lines being located between two adjacent columns of sub-pixel units;
   a lenticular lens grating, provided at a light emitting side of the display panel, splitting light emitted from the display panel, and comprising a plurality of lens units, wherein each of the plurality of lens units corresponds to at least two adjacent columns of sub-pixel units in the display panel;
   in a 3D display mode, a plurality of columns of sub-pixel units in the display panel alternatively display a left eye image/a right eye image and a right eye image/a left eye image, and each of the lens units comprises, in a region corresponding to each column of the sub-pixel units, a lens structure matching the left eye image or the right eye image currently displayed by the column of the sub-pixel units,
   the display panel is driven by using a driving manner of scanning column by column, when the display panel is performing the scanning column by column, the corresponding lens unit in the lenticular lens grating synchronously changes the lens structure thereof.

2. The 3D display device according to claim 1, wherein, during displaying a current frame of image, one of the plurality of columns of the sub-pixel units display the left eye image/the right eye image, while an adjacent column of the sub-pixel units display the right eye image/the left eye image; during displaying a next frame of image, the one column of sub-pixel units display the right eye image/the left eye image, while the adjacent column of the sub-pixel units display the left eye image/the right eye image.

3. The 3D display device according to claim 1, wherein the lens structure of each of the lens units in a region corresponding to each column of the sub-pixel units is separately controlled.

4. The 3D display device according to claim 1, wherein each of the plurality of the lens units corresponds to the same number of columns of sub-pixel units.

5. The 3D display device according to claim 1, wherein an image switching of each column of the sub-pixel units in the display panel and a conversion of the lens structure of the lens units in the region corresponding to the region of the each column of the sub-pixel units are performed synchronously.

6. The 3D display device according to claim 1, wherein the display panel is a liquid crystal display panel, an organic electroluminescent display panel, a plasma display panel or a field emission display panel.

7. The 3D display device according to claim 2, wherein a time interval between the current frame of image and the next frame of image is shorter than or equal to a visual persistence time of the human eye.

8. The 3D display device according to claim 1, wherein a refresh frequency of the display panel is equal to or larger than 120 Hz.

9. The 3D display device according to claim 2, wherein, during displaying the current frame of image and the next frame of image, the lens structures of the lens units shift one column of sub-pixel units along a column scanning direction of the display panel.

10. The 3D display device according to claim 1, wherein, the lenticular lens grating is a liquid crystal lens grating, comprising: an upper substrate and a lower substrate; a liquid crystal layer disposed between the upper substrate and the lower substrate; strip-shaped electrodes disposed on the upper substrate; and a plate electrode disposed on the lower substrate.

11. The 3D display device according to claim 2, wherein, the display panel displays a black frame between the current frame of image and the next frame of image.

12. The 3D display device according to claim 11, wherein, when the display panel displays the black frame, a region of the lens units corresponding to each column of the sub-pixel units has a lens structure corresponding to the next frame of image.

13. A driving method of the 3D display panel according to claim 1, comprising:
  displaying each frame of image in the display panel by using a driving manner of scanning the gate signal lines column by column;
  in a 3D display mode, when an image displayed by one column of the sub-pixel units in the display panel changes, in the lenticular lens grating, a lens structure in a region of the lens units corresponding to the one column of the sub-pixel units is changed into a lens structure matching a left eye image or a right eye image to be displayed by the one column of sub-pixel units.

14. The driving method according to claim 13, wherein an image switching of each column of the sub-pixel units in the display panel and a conversion of the lens structure of the lens units in the region corresponding to the column of the sub-pixel units are performed synchronously.

15. The driving method according to claim 13, wherein, in the 3D display mode, when the display panel displays each frame of image, the method further comprises:
  inserting a black frame using the driving manner of scanning the gate signal lines column by column between a current frame of image and a next frame of image displayed by the display panel.

16. The driving method according to claim 15, wherein, changing the image displayed by the one column of the sub-pixel units comprises:
  changing the image displayed by the one column of sub-pixel units from the left eye image to the right eye image;
  changing the image displayed by the one column of sub-pixel units from the right eye image to the left eye image;
  changing the image displayed by the one column of sub-pixel units from the left eye image to the black frame; or
  changing the image displayed by the one column of sub-pixel units from the right eye image to the black frame.

17. The driving method according to claim 13, wherein the driving manner of scanning the gate signal lines column by column comprises:
  sequentially applying a gate scanning signal to each of the gate signal lines in an order from left to right, from right to left, from middle to two sides, or from two sides to middle.

18. The driving method according to claim 15, wherein the inserting the black frame between the current frame of image and the next frame of image comprises:
  when an image displayed by a current column of sub-pixel units changes from the left eye image/the right eye image of the current frame of image to the black frame, restructuring the lens structure of the lens units corresponding to the current column of sub-pixel units, and changing it into a lens structure corresponding to the next frame of image.

19. The driving method according to claim 18, wherein, the lens structure of the plurality of lens units is not changed when the image displayed by the current column of sub-pixel units is changed from the black frame to the next frame of image.

* * * * *